US009971722B2

(12) United States Patent
Shibata et al.

(10) Patent No.: US 9,971,722 B2
(45) Date of Patent: May 15, 2018

(54) ONBOARD APPARATUS, AND ONBOARD COMMUNICATION SYSTEM

(71) Applicant: DENSO CORPORATION, Kariya, Aichi-pref. (JP)

(72) Inventors: Minoru Shibata, Kariya (JP); Hiromichi Matsuoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 58 days.

(21) Appl. No.: 14/917,844

(22) PCT Filed: Aug. 7, 2014

(86) PCT No.: PCT/JP2014/004125
§ 371 (c)(1),
(2) Date: Mar. 9, 2016

(87) PCT Pub. No.: WO2015/037183
PCT Pub. Date: Mar. 19, 2015

(65) Prior Publication Data
US 2016/0224499 A1    Aug. 4, 2016

(30) Foreign Application Priority Data
Sep. 11, 2013    (JP) .................................. 2013-188385

(51) Int. Cl.
*G06F 13/42*    (2006.01)
*G06F 13/00*    (2006.01)
(Continued)

(52) U.S. Cl.
CPC ........ *G06F 13/4022* (2013.01); *B60R 16/023* (2013.01); *G01C 21/26* (2013.01);
(Continued)

(58) Field of Classification Search
None
See application file for complete search history.

(56) References Cited

U.S. PATENT DOCUMENTS 6,263,393 B1 *    7/2001    Funaya ............... G06F 13/4022
                                                                710/240
8,090,961 B2    1/2012    Yoffe et al.
(Continued)

FOREIGN PATENT DOCUMENTS

JP    2002323941 A    11/2002
JP    2003316711 A    11/2003
(Continued)

OTHER PUBLICATIONS

International Search Report and Written Opinion (in Japanese with English Translation) for PCT/JP2014/004125, dated Oct. 14, 2014; ISA/JP.

*Primary Examiner* — Michael Sun
(74) *Attorney, Agent, or Firm* — Harness, Dickey & Pierce, P.L.C.

(57)    ABSTRACT

An onboard apparatus comprising a connection portion, a control block, and a bus switch is provided. The connection portion connects with an external device mounted to a vehicle, and includes at least a data terminal to input and output a communication data and a control terminal to output a communication availability signal that indicates communication is available or not. The control block performs data communication with the external device, which is connected to the connection portion. The bus switch, according to a permission signal, changes a non-conduction state to a conduction state of a transmission path from the control block to the data terminal. A signal level of the permission signal varies when an output of the control block is stabilized after the onboard apparatus starts.

9 Claims, 2 Drawing Sheets

(51) Int. Cl.
*G06F 13/40* (2006.01)
*G01C 21/26* (2006.01)
*G06F 13/10* (2006.01)
*G06F 3/00* (2006.01)
*B60R 16/023* (2006.01)
*G06F 1/26* (2006.01)

(52) U.S. Cl.
CPC ............... *G06F 1/266* (2013.01); *G06F 3/00* (2013.01); *G06F 13/10* (2013.01)

(56) References Cited

U.S. PATENT DOCUMENTS

| | | | |
|---|---|---|---|
| 2002/0157039 | A1 | 10/2002 | Ihara |
| 2005/0203683 | A1* | 9/2005 | Olsen ................... B60R 25/1004 701/29.3 |
| 2006/0200286 | A1* | 9/2006 | Kumagai ............. G01C 21/005 701/33.4 |
| 2008/0239608 | A1 | 10/2008 | Yoshitomi |
| 2012/0124571 | A1 | 5/2012 | Nagai et al. |
| 2012/0330498 | A1 | 12/2012 | Nagara et al. |
| 2015/0298550 | A1* | 10/2015 | Okada ................... B60K 37/06 345/173 |

FOREIGN PATENT DOCUMENTS

| | | | |
|---|---|---|---|
| JP | 2005352648 | A | 12/2005 |
| JP | 2007018102 | A | 1/2007 |
| JP | 2012103181 | A | 5/2012 |
| JP | 2013009370 | A | 1/2013 |

* cited by examiner

ONBOARD APPARATUS, AND ONBOARD COMMUNICATION SYSTEM

CROSS REFERENCE TO RELATED APPLICATIONS

This application is a U.S. National Phase Application under 35 U.S.C. 371 of International Application No. PCT/JP2014/004125 filed on Aug. 7, 2014 and published in Japanese as WO 2015/037183 A1 on Mar. 19, 2015. This application is based on and claims the benefit of priority from Japanese Patent Application No. 2013-188385 filed on Sep. 11, 2013. The entire disclosures of all of the above applications are incorporated herein by reference.

TECHNICAL FIELD

The present disclosure relates to a technology that allows an onboard apparatus including a connection portion with an external device to transmit and receive data with the external device connected to the connection portion.

BACKGROUND ART

An onboard apparatus that includes a navigation function to provide route guidance to a destination point or an audio function to reproduce video or music has been known. This type of onboard apparatus includes the USB (Universal Serial Bus) interface as a connection interface that connects with an external device (referring Patent literature 1, for example).

In general, the external device to be connected through the USB interface uses a signal to indicate whether or not communication is available. The external device starts data transmission and reception through a bus when confirming that the onboard apparatus is capable of communication.

The inventors of the present application have found the following. When the power supply is turned on, a microcomputer included in an onboard instrument may cause an instable signal level at an output terminal. This instable state may change the signal level at a terminal to transmit and receive data before a communication availability signal (a signal that indicate the communication availability) reaches a signal level to confirm that the communication is available. In such a case, the external device may determine to be a communication error, lock the communication through the USB interface, and disable the communication.

PRIOR ART LITERATURES

Patent Literature

Patent literature 1: JP 2003-316711 A

SUMMARY OF INVENTION

It is an object of the present disclosure to improve operation reliability at the time an external device is connected.

According to one aspect of the present disclosure, an onboard apparatus comprising: a connection portion that connects with an external device mounted to a vehicle, and includes at least a data terminal to input and output a communication data and a control terminal to output a communication availability signal that indicates communication is available or not; a control block that performs data communication with the external device, which is connected to the connection portion is provided.

A permission signal is a signal whose signal level varies when an output of the control block is stabilized after the onboard apparatus starts. The onboard apparatus includes a bus switch that, according to the permission signal, changes a non-conduction state to a conduction state of a transmission path from the control block to the data terminal.

According one aspect of the present disclosure, an onboard communication system including the onboard apparatus and an external device connected to the connection portion is provided. When the communication availability signal is set to a signal level indicating that communication is unavailable, and when the external device detects a signal level change in the communication data, the external device determines as an error and disables communication.

According to the onboard apparatus and the onboard communication system, the bus switch disconnects the data terminal from the control block (to enable the non-conduction state). It is supposed that an output from the control block varies after the control block starts up and before the communication availability signal changes to the signal level indicating that the communication is available. Thus, it may be possible to prevent the effect from being transmitted to the outside through the data terminal. It may be possible to prevent the external device from detecting a communication error due to an unstable output from the control block. Therefore, it may be possible to improve operation reliability when the external device is connected.

BRIEF DESCRIPTION OF DRAWINGS

The above and other objects, features and advantages of the present disclosure will become more apparent from the following detailed description made with reference to the accompanying drawings. In the drawings.

PREFERRED EMBODIMENTS FOR CARRYING OUT INVENTION

Embodiments of the present disclosure will be described in detail with reference to the drawings.

(Overall Configuration)

Figure 1:
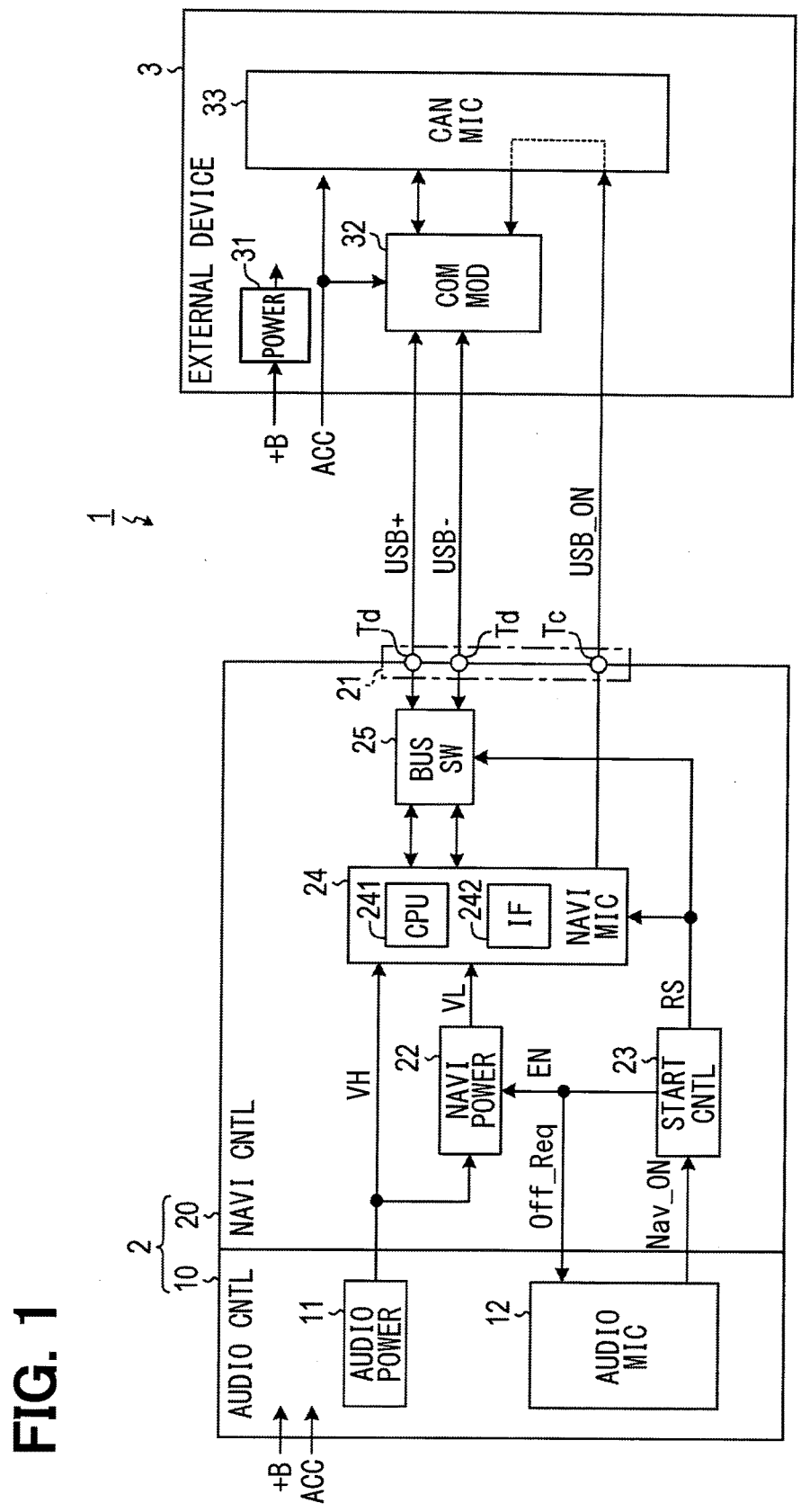
FIG. 1 is a block diagram illustrating an overall configuration of an onboard communication system.

An onboard communication system 1 in FIG. 1 includes an onboard apparatus 2 having a USB interface 21, and an external device 3 connected to the USB interface 21, the external device 3 being used. The USB interface 21 corresponds to a connection portion according to the present disclosure.

The USB interface 21 includes a pair of data terminals Td-Td and control terminal Tc. Data terminals Td-Td are used to input and output communication data USB+, USB−. The control terminal Tc outputs a communication availability signal USB_ON indicating whether the communication through the USB interface 21 is available or not. The communication availability signal USB_ON turns off (or referred to as a low level in the embodiment) to indicate disabled communication, and turns on (or referred to as a high level in the embodiment) to indicate enabled communication.

The onboard apparatus 2 and the external device 3 use an onboard battery (not shown) as a power supply. The onboard apparatus 2 and the external device 3 start when an ACC (accessory) signal changes to an on state from an off state. The onboard apparatus 2 and the external device 3 operate while the ACC signal is in the on state. The communication through the USB interface 21 uses a predetermined serial communication protocol (hereinafter, referred to as a USB protocol).

Hereinafter, among configurations of the onboard apparatus 2 and the external device 3, configurations concern a power supply system and a communication system according to the disclosure will be explained.

(External Device)

The external device 3 includes a power supply circuit 31, a communication module 32, and a CAN microcomputer 33.

The power supply circuit 31 operates by receiving the power (+B) supplied from the onboard battery and supplies a predetermined voltage of power to each component of the external device 3.

The communication module 32 transmits and receives data based on the USB protocol through the USB interface 21. In addition, the communication module 32 converts a protocol between the USB protocol and the CAN protocol.

The CAN microcomputer 33 is provided as a known computer. The CAN microcomputer 33 communicates with the onboard apparatus 2 based on the CAN protocol through the communication module 32. The CAN microcomputer 33 uses the communication with the onboard apparatus 2 to perform various functions assigned to the external device 3. The CAN microcomputer 33 performs communication through the communication module when the communication availability signal USB_ON is turned on. The communication module 32 may detect a change in the signal level corresponding to communication data USB+, USB− when the communication availability signal USB_ON is in the off state. In this case, the CAN microcomputer 33 determines this case as a communication error, and locks (disables) the communication function. The communication remains unavailable even when communication availability signal USB_ON turns on after the communication function is locked.

(Onboard Apparatus)

The onboard apparatus 2 includes an audio controller 10 and a navigation controller 20. The audio controller 10 implements functions to provide various types of audible and visible information using various audio devices mounted to a vehicle. The navigation controller 20 implements a known navigation function such as route setting or route guidance to a destination, using the audio controller 10 or the like.

The audio controller 10 includes an audio power supply circuit 11 and an audio microcomputer 12, the both of which operate on the power supplied from the onboard battery. The audio power supply circuit 11 corresponds to an external power supply of the present disclosure. The audio power supply circuit 11 converts a battery voltage into a predetermined voltage VH (for example, 3.3 V) to supply the power to the navigation controller 20. The audio microcomputer 12 controls an audio device mounted to the vehicle based on an instruction from an unshown input portion. The audio microcomputer 12 turns on a start instruction Nav_ON to control start-and-stop of the navigation controller 20. The start instruction Nav_ON starts the navigation controller 20 when the ACC signal turns on. It is supposed that the ACC signal turns off or that a stop request Off_Req from the navigation controller 20 changes to the on state from the off state when the start instruction Nav_ON is turned on. In this case, the audio microcomputer 12 turns off the start instruction Nav_ON that controls the start-and-stop of the navigation controller 20.

The navigation controller 20 includes the USB interface 21, a navigation power supply circuit 22, a start control portion 23, a navigation microcomputer 24, and a bus switch 25. The navigation power supply circuit 22 corresponds to an internal power supply of the present disclosure. The navigation microcomputer 24 corresponds to a control block of the present disclosure.

The navigation power supply circuit 22 is supplied with the power (voltage VH) from the audio power supply circuit 11. The navigation power supply circuit 22 starts when a start enabling signal EN from the start control portion 23 changes to the on state from the off state. While the start enabling signal EN remains on, the navigation power supply circuit 22 converts the predetermined voltage VH into predetermined voltage VL (for example, 1.2 V) and supplies the power to the navigation microcomputer 24.

The navigation microcomputer 24 is provided as a known computer. The navigation microcomputer 24 includes a CPU core portion 241 and an interface portion 242 that inputs and outputs a signal to the CPU core portion 241. The CPU core portion 241 operates on the power supplied from the navigation power supply circuit 22. The interface portion 242 operates on the power supplied from the audio power supply circuit 11. The navigation microcomputer 24 starts operating when the start control portion 23 outputs a reset signal RS to release a reset state. The navigation microcomputer 24 changes the communication availability signal USB_ON from the off state to the on state. The navigation microcomputer 24 then starts the communication through the USB interface 21, that is, starts transmitting and receiving the communication data USB+, USB−. The navigation microcomputer 24 includes at least a function corresponding to the communication module 32 of the external device 3 and a function to perform the communication based on the CAN protocol.

Based on a known technology, the bus switch 25 controls the conduction state of a transmission path from the navigation microcomputer 24 to the data terminals Td-Td of the USB interface 21 according to the reset signal RS from the start control portion 23. The bus switch 25 enables impedance matching with a USB bus (consequently the external device 3) connected to the USB interface 21. The bus switch 25 operates on the power supplied from the audio power supply circuit 11. The bus switch 25 becomes a non-conduction state when the reset signal RS maintains a signal level that indicates the reset state. The bus switch 25 enters a conduction state when the reset signal RS maintains a signal level that indicates the reset release state.

The start control portion 23 operates on the power supplied from the onboard battery. When the start instruction Nav_ON changes to the on state from the off state, the start control portion 23 turns on the start enabling signal EN to start the navigation power supply circuit 22. The start control portion 23 spends a predetermined wait time that is required to stabilize an output (supplied voltage VL) from the navigation power supply circuit 22. After passing the predetermined wait time, the start control portion 23 then changes the signal level of the reset signal RS to the reset release state from the reset state. The navigation microcomputer 24 starts and the bus switch 25 enters the conduction state.

When the start instruction Nav_ON changes to the off state from the on state, the start control portion 23 turns off the start enabling signal EN to stop the navigation power supply circuit 22. The start control portion 23 changes the signal level of the reset signal RS to the reset state. As a result, the navigation microcomputer 24 is reset and the bus switch 25 enters the non-conduction state.

When the start instruction Nav_ON is in the on state, and the start control portion 23 determines that the state of the navigation controller 20 satisfies a predetermined off-condition, the start control portion 23 turns off the start enabling signal EN (or turns on the stop request Off_Req) to stop the navigation power supply circuit 22 and requests to stop the audio microcomputer 12.

(Operation)

Figure 2:
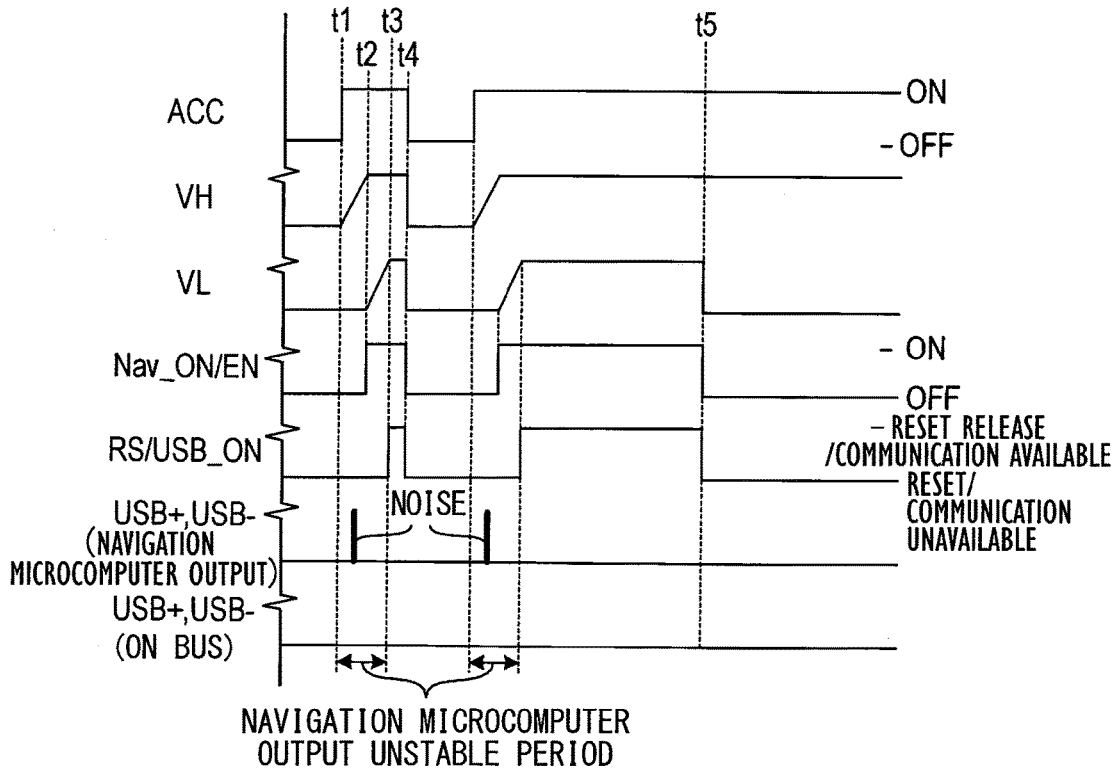
FIG. 2 is a timing chart illustrating an operation of a navigation controller.

As described in FIG. 2, according to the onboard communication system, when the ACC signal turns on (time t1), the audio power supply circuit 11 in the audio controller 10 starts supplying the power (the voltage VH). After that, an output from the audio power supply circuit 11 is stabilized, and the audio microcomputer 12 is activated to start processing. Then, the start instruction Nav_ON transmitted from the audio controller 10 to the navigation controller 20 turns on (time t2). In response, the navigation controller 20 turns on the start enabling signal EN. The navigation power supply circuit 22 starts supplying the power (voltage VL). The signal level of the reset signal RS changes to the reset release state (time t3) at the timing when the output from the navigation power supply circuit 22 is stabilized. The bus switch 25 becomes the conduction state, and the navigation microcomputer 24 is activated to start processing. The communication availability signal USB_ON turns on. Subsequently, the onboard apparatus 2 can communicate with the external device 3 connected to the USB interface 21.

It is supposed that the ACC signal turns off (time t4) while the onboard apparatus 2 is communicable with the external device 3. In this case, the audio power supply circuit 11 in the audio controller 10 stops supplying the power. The start instruction Nav_ON transmitted to the navigation controller 20 turns off. In response, the navigation controller 20 turns off the start enabling signal EN and changes the signal level of the reset signal RS to the reset state. The navigation power supply circuit 22 stops supplying the power, the bus switch 25 becomes a cutoff state, and the navigation microcomputer 24 becomes the reset state.

A stop condition may be satisfied (time t5) while the onboard apparatus 2 is communicable with the external device 3. In this case, the navigation controller 20 turns off the start enabling signal EN (or turns on the stop request Off_Req) and causes the navigation power supply circuit 22 to stop supplying the power. The audio controller 10 receives the stop request Off_Req and turns off the start instruction Nav_ON. In response, the navigation controller 20 turns off the reset signal RS, the bus switch 25 becomes the cutoff state, and the navigation microcomputer 24 becomes the reset state.

(Effect)

The onboard apparatus 2 changes the bus switch 25 to the conduction state from the non-conduction state in response to the reset signal RS whose signal level varies at the timing when the output from the navigation microcomputer 24 is stabilized. The bus switch 25 is provided for the signal route from the navigation microcomputer 24 to the data terminals Td-Td of the USB interface 21. In addition, the onboard apparatus 2 turns on the communication availability signal USB_ON (corresponding to a signal level that indicates that the communication is available). The communication availability signal USB_ON indicates whether the communication through the USB interface 21 is available or not.

The signal level may change due to an unstable output from the navigation microcomputer 24. It may be possible that the onboard apparatus 2 prevents this signal level change from being transmitted to the external device 3 through data terminals Td-Td before the communication availability signal USB_ON turns on in the external device 3.

In the onboard apparatus 2, the navigation microcomputer 24 is configured to supply the power to the CPU core portion 241 later than to the interface portion 242. The output from the navigation microcomputer 24 may be unstable after the audio power supply circuit 11 (referring to time t1 in FIG. 2) starts until the output from the navigation microcomputer 24 is stabilized (referring to time t3 in FIG. 2). During this period, the signal levels of the communication data USB+, USB− may change regardless of the operation of the navigation microcomputer 24. The signal route from the bus switch 25 to the USB interface 21 is cut off during the period in which the output from the navigation microcomputer is unstable. It may be possible to prevent the signal level change from being transmitted to the outside through the USB interface 21.

Accordingly, it may be possible to suppress detection of a communication error in the external device 3 due to a change in the communication data USB+, USB− before the communication availability signal USB_ON turns on. Thus, it may be possible to improve the operation reliability when the external device 3 is connected.

(Other Embodiment)

While there has been described the specific preferred embodiment of the present disclosure, it is to be distinctly understood that the disclosure is not limited thereto but may be otherwise variously embodied within the spirit and scope of the invention.

Figure 3:
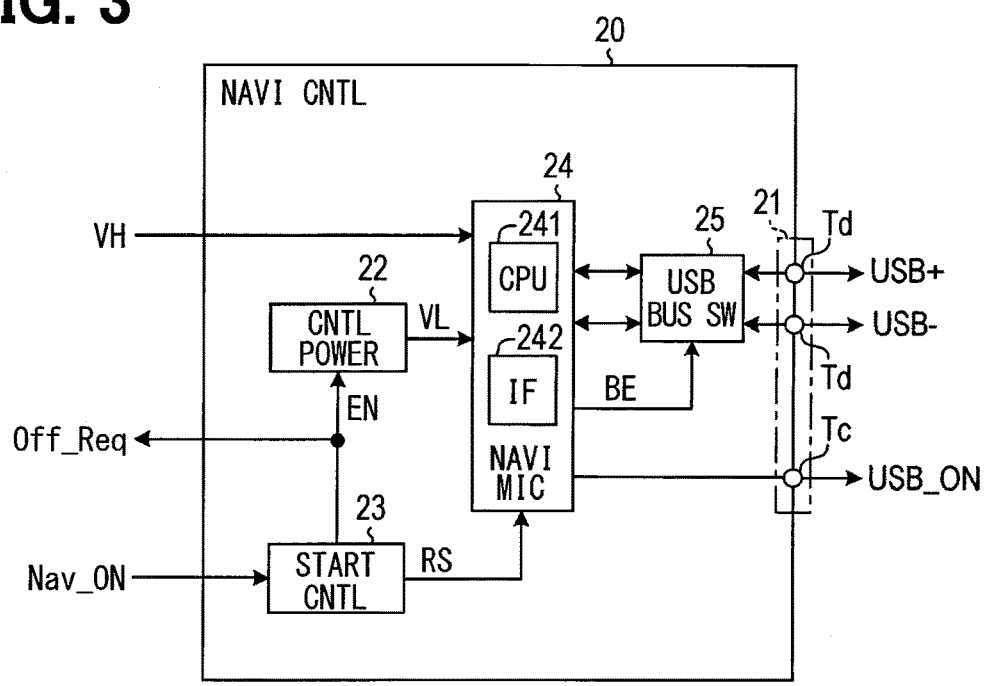
FIG. 3 is a block diagram illustrating a modification of the navigation controller.

(1) The embodiment uses the reset signal RS as a signal to control the bus switch 25. As illustrated in FIG. 3, the navigation microcomputer 24 may generate the bus enabling signal BE comparable to the communication availability signal USB_ON and control the bus switch 25 using the bus enabling signal BE. The communication availability signal USB_ON may be used instead of the bus enabling signal BE.

(2) The components described in the disclosure are conceptual and are not limited to the embodiment. A function included in one component may be distributed to several components. Functions included in several components may be integrated into one component. At least part of the configuration of the embodiment may be replaced with a known configuration that includes a comparable function. At least part of the configuration of the embodiment may be added to or may replace the other configurations of the embodiment.

The onboard apparatus according to the disclosure includes a connection portion, a control block, and a bus switch.

The connection portion connects an external device mounted to a vehicle. The connection portion includes at least a data terminal to transmit or receive communication data and a control terminal to output a communication availability signal that indicates communication availability. The control block performs data communication with the external device connected to the connection portion. The bus switch changes a transmission path from a non-conduction state to a conduction state based on a permission signal. The transmission path is provided from the control block to the data terminal. The permission signal changes its signal level when an output of the control block is stabilized after the onboard apparatus starts.

According to the configuration, the bus switch disconnects the data terminal from the control block (to be the non-conduction state). It is supposed that that the control block starts and the output from the control block varies before the communication availability signal changes to the signal level indicating that the communication is available. Even in this case, it may be possible to prevent the effect from being transmitted to the outside through the data terminal. Thus, it may be possible to prevent the external device from detecting a communication error due to an unstable output of the control block. Therefore, it may be possible to improve the operation reliability when the external device is connected.

The disclosure can be embodied as the onboard apparatus and also as an onboard communication system including the onboard apparatus as a component.

While the embodiments, the configurations, and the modes of the onboard apparatus and the onboard communication system according to the present disclosure are illustrated above, embodiments, configurations, and modes according to the present disclosure are not limited to the respective embodiments, the respective configurations, and the respective modes described above. For example, an embodiment, a configuration, and an aspect which are obtained by appropriately combining technical portions disclosed in different embodiments, configurations, and aspects are also included in the embodiments, the configurations, and the aspects according to the present disclosure.

What is claimed is:

1. An onboard apparatus comprising:
a connection portion that connects with an external device mounted to a vehicle, and includes at least a data terminal to input and output a communication data and a control terminal to output a communication availability signal that indicates whether communication is available or not;
a control block that performs data communication with the external device, which is connected to the connection portion; and
a bus switch that, according to a permission signal, changes a non-conduction state to a conduction state of a transmission path from the control block to the data terminal, wherein a signal level of the permission signal varies when an output of the control block is stabilized after the onboard apparatus starts, and
the permission signal is provided by
a reset signal generated by a start control portion to control the reset state of the control block, or
a signal generated by the control block in synchronization with the reset signal.

2. The onboard apparatus according to claim 1, comprising:
an internal power supply that operates on power supplied from an external power supply and supplies power at a supply voltage that is different from the external power supply; and
the start control portion
maintains a reset state of the control block at a timing to start the onboard apparatus,
starts the internal power supply in response to reception of a start instruction starting the control block, and
releases the reset state of the control block at a timing to stabilize an output voltage of the internal power supply.

3. The onboard apparatus according to claim 2, wherein:
the control block includes a microcomputer containing a CPU core portion and an interface portion;
the interface portion operates on power supplied from the external power supply; and
the CPU core portion operates on power supplied from the internal power supply.

4. The onboard apparatus according to claim 1, wherein:
the connection portion is provided by a USB interface.

5. An onboard communication system comprising:
the onboard apparatus according to claim 1; and
an external device connected to the connection portion, wherein:
when the communication availability signal is set to a signal level indicating that communication is unavailable, and when the external device identifies a signal level change detected in the communication data, the external device determines as an error and disables communication.

6. An onboard apparatus comprising:
a connection portion that connects with an external device mounted to a vehicle, and includes at least a data terminal to input and output a communication data and a control terminal to output a communication availability signal that indicates whether communication is available or not;
a control block that performs data communication with the external device, which is connected to the connection portion;
a bus switch that, according to a permission signal, changes a non-conduction state to a conduction state of a transmission path from the control block to the data terminal, wherein a signal level of the permission signal varies when an output of the control block is stabilized after the onboard apparatus starts;
an internal power supply that operates on power supplied from an external power supply and supplies power at a supply voltage that is different from the external power supply; and
a start control portion that
maintains a reset state of the control block at a timing to start the onboard apparatus,
starts the internal power supply in response to reception of a start instruction starting the control block, and
releases the reset state of the control block at a timing to stabilize an output voltage of the internal power supply,
wherein:
the permission signal is provided by
a reset signal generated by the start control portion to control the reset state of the control block, or
a signal generated by the control block in synchronization with the reset signal.

7. The onboard apparatus according to claim 6, wherein:
the control block includes a microcomputer containing a CPU core portion and an interface portion;
the interface portion operates on power supplied from the external power supply; and
the CPU core portion operates on power supplied from the internal power supply.

8. The onboard apparatus according to claim 6, wherein:
the connection portion is provided by a USB interface.

9. An onboard communication system comprising:
the onboard apparatus according to claim 6; and
an external device connected to the connection portion, wherein:

when the communication availability signal is set to a signal level indicating that communication is unavailable, and when the external device identifies a signal level change detected in the communication data, the external device determines as an error and disables communication.

\* \* \* \* \*